United States Patent
Kyoya

(10) Patent No.: US 12,518,209 B2
(45) Date of Patent: Jan. 6, 2026

(54) LEARNING DEVICE AND INFERENCE DEVICE FOR MAINTENANCE OF AIR CONDITIONER

(71) Applicant: Mitsubishi Electric Corporation, Tokyo (JP)

(72) Inventor: Takanori Kyoya, Tokyo (JP)

(73) Assignee: Mitsubishi Electric Coproration, Tokyo (JP)

( * ) Notice: Subject to any disclaimer, the term of this patent is extended or adjusted under 35 U.S.C. 154(b) by 741 days.

(21) Appl. No.: 17/799,975

(22) PCT Filed: May 14, 2020

(86) PCT No.: PCT/JP2020/019339
§ 371 (c)(1),
(2) Date: Aug. 16, 2022

(87) PCT Pub. No.: WO2021/229768
PCT Pub. Date: Nov. 18, 2021

(65) Prior Publication Data
US 2023/0080073 A1  Mar. 16, 2023

(51) Int. Cl.
*G06N 20/00* (2019.01)
*G06N 5/04* (2023.01)

(52) U.S. Cl.
CPC .............. *G06N 20/00* (2019.01); *G06N 5/04* (2013.01)

(58) Field of Classification Search
CPC .......... G06N 20/00; G06N 5/04; G06N 3/045; G06N 3/09; F24F 11/39
See application file for complete search history.

(56) References Cited

U.S. PATENT DOCUMENTS 9,310,404 B2 *  4/2016  Takei ................ G01R 21/02
11,521,200 B1 * 12/2022  Khan ............... G06Q 20/38215
(Continued)

FOREIGN PATENT DOCUMENTS

| JP | H07-63405 A | 3/1995 |
|---|---|---|
| JP | 2000-153121 A | 6/2000 |
| JP | 2000-171385 A | 6/2000 |

OTHER PUBLICATIONS

International Search Report of the International Searching Authority mailed Jul. 21, 2020 for the corresponding international application No. PCT/JP2020/019339 (and English translation).

*Primary Examiner* — Joseph P Hirl
(74) *Attorney, Agent, or Firm* — Posz Law Group, PLC

(57) ABSTRACT

A model generation unit converts each of a first model, a second model, and a third model into a trained model. First training data includes a first parameter representing the degree of clogging of an air filter, a second parameter pertaining to the air-conditioning power of an air-conditioning system, and a third parameter representing an increased amount of electric power cost of the air-conditioning system due to the first parameter during operation of the second parameter. Second training data includes a fourth parameter representing a first date and time and a fifth parameter pertaining to air-conditioning power of the air-conditioning system assumed on the first date and time. Third training data includes a sixth parameter representing a second date and time and a seventh parameter representing a maintenance cost of the air filter on the second date and time.

15 Claims, 5 Drawing Sheets

(56) References Cited

U.S. PATENT DOCUMENTS

| | | | |
|---|---|---|---|
| 2003/0051861 A1* | 3/2003 | Yeung | F24C 15/20 |
| | | | 165/122 |
| 2010/0216686 A1* | 8/2010 | Kobayashi | B01D 53/78 |
| | | | 510/475 |
| 2020/0225655 A1* | 7/2020 | Cella | G06F 18/2178 |
| 2020/0348662 A1* | 11/2020 | Cella | G05B 19/41865 |
| 2022/0292827 A1* | 9/2022 | Chen | G06F 16/786 |
| 2023/0325722 A1* | 10/2023 | Zhan | G06F 21/6245 |
| | | | 706/12 |

* cited by examiner

LEARNING DEVICE AND INFERENCE DEVICE FOR MAINTENANCE OF AIR CONDITIONER

CROSS REFERENCE TO RELATED APPLICATION

This application is a U.S. national stage application of PCT/JP2020/019339 filed on May 14, 2020, the contents of which are incorporated herein by reference.

TECHNICAL FIELD

The present disclosure relates to a learning device and an inference device for maintenance of an air conditioner.

BACKGROUND ART

Conventionally, a device that detects a maintenance timing of an air filter for air conditioning is known. For example, Japanese Patent Laying-Open No. H07-63405 (Patent Literature 1) discloses a device for displaying dirt of an air filter. The device for displaying dirt of an air filter detects, as a change in torque of a fan motor, a change in an air volume of the fan associated with clogging of the air filter in a convection air conditioner that controls a rotational speed of the fan motor. The device for displaying dirt of an air filter grasps the clogging state of the air filter by using the fact that the torque corresponds to the value of current supplied to the fan motor. The device for displaying dirt of an air filter reliably detects the clogging state of the air filter and provides external notification indicating the clogging state to thereby prompt cleaning or replacement of the air filter, so that it is possible to prevent a functional degradation of the fan motor, an increase in noise, and a machine failure in advance.

CITATION LIST

Patent Literature

PTL 1: Japanese Patent Laying-Open No. H07-63405

SUMMARY OF INVENTION

Technical Problem

Even if clogging of the air filter which causes a decrease in electric power efficiency of the air conditioner can be detected, maintenance (for example, cleaning and replacement) of the air filter requires cost. The cost required for maintenance of the air filter varies depending on the type of air conditioner (for example, a ceiling embedded type or a duct type), the number of air filters, variations in the degree of clogging due to the installation condition of the air filter, labor costs, and the execution time of cleaning and replacement of the air filter. That is, it is necessary to comprehensively consider many factors in order to determine the optimum timing of maintenance of the air filter. However, since the method for detecting clogging of an air filter disclosed in Patent Literature 1 is a rule-based method based on comparison between a current value and a threshold value, elements other than the current value cannot be reflected in determination of the maintenance timing of the air filter.

The present disclosure has been accomplished to solve the above-described problems, and an object of the present disclosure is to reduce a maintenance cost of an air filter.

Solution to Problem

A learning device according to one aspect of the present disclosure learns maintenance of an air-conditioning system including at least one air filter. The learning device includes a first data acquisition unit and a model generation unit. The first data acquisition unit acquires first training data, second training data, and third training data. The model generation unit converts each of a first model, a second model, and a third model into a trained model using the first training data, the second training data, and the third training data. The first training data includes a first parameter representing a degree of clogging of the at least one air filter, a second parameter pertaining to air-conditioning power of the air-conditioning system, and a third parameter representing an increased amount of electric power cost of the air-conditioning system due to the first parameter during operation of the second parameter. The second training data includes a fourth parameter representing a first date and time and a fifth parameter pertaining to air-conditioning power of the air-conditioning system assumed on the first date and time. The third training data includes a sixth parameter representing a second date and time and a seventh parameter representing a maintenance cost of the at least one air filter on the second date and time. The first model estimates the third parameter from the first parameter and the second parameter. The second model estimates the fifth parameter from the fourth parameter. The third model estimates the seventh parameter from the sixth parameter.

An inference device according to another aspect of the present disclosure infers maintenance of an air-conditioning system including at least one air filter using a first model that has been trained, a second model that has been trained, and a third model that has been trained. The first model estimates a third parameter from a first parameter and a second parameter. The second model estimates a fifth parameter from a fourth parameter. The third model estimates a seventh parameter from a sixth parameter. The first parameter represents a degree of clogging of the at least one air filter. The second parameter pertains to air-conditioning power of the air-conditioning system. The third parameter represents an increased amount of electric power cost of the air-conditioning system due to the first parameter during operation of the second parameter. The fourth parameter represents a first date and time. The fifth parameter represents air-conditioning power of the air-conditioning system assumed on the first date and time. The sixth parameter represents a second date and time. The seventh parameter represents a maintenance cost of the at least one air filter on the second date and time. The inference device includes a data acquisition unit and an inference unit. The data acquisition unit acquires the first parameter, the second parameter, the fourth parameter, and the fifth parameter. The inference unit uses the first model, the second model, and the third model. The inference unit estimates the third parameter from the first parameter and the second parameter using the first model, estimates the fifth parameter from the fourth parameter using the second model, and estimates the seventh parameter from the sixth parameter using the third model.

Advantageous Effects of Invention

According to the learning device and the inference device of the present disclosure, the first model estimates the third parameter from the first parameter and the second parameter, the second model estimates the fifth parameter from the fourth parameter, and the third model estimates the seventh parameter from the sixth parameter, whereby the maintenance cost of the air filter can be reduced.

DESCRIPTION OF EMBODIMENTS

Figure 1:
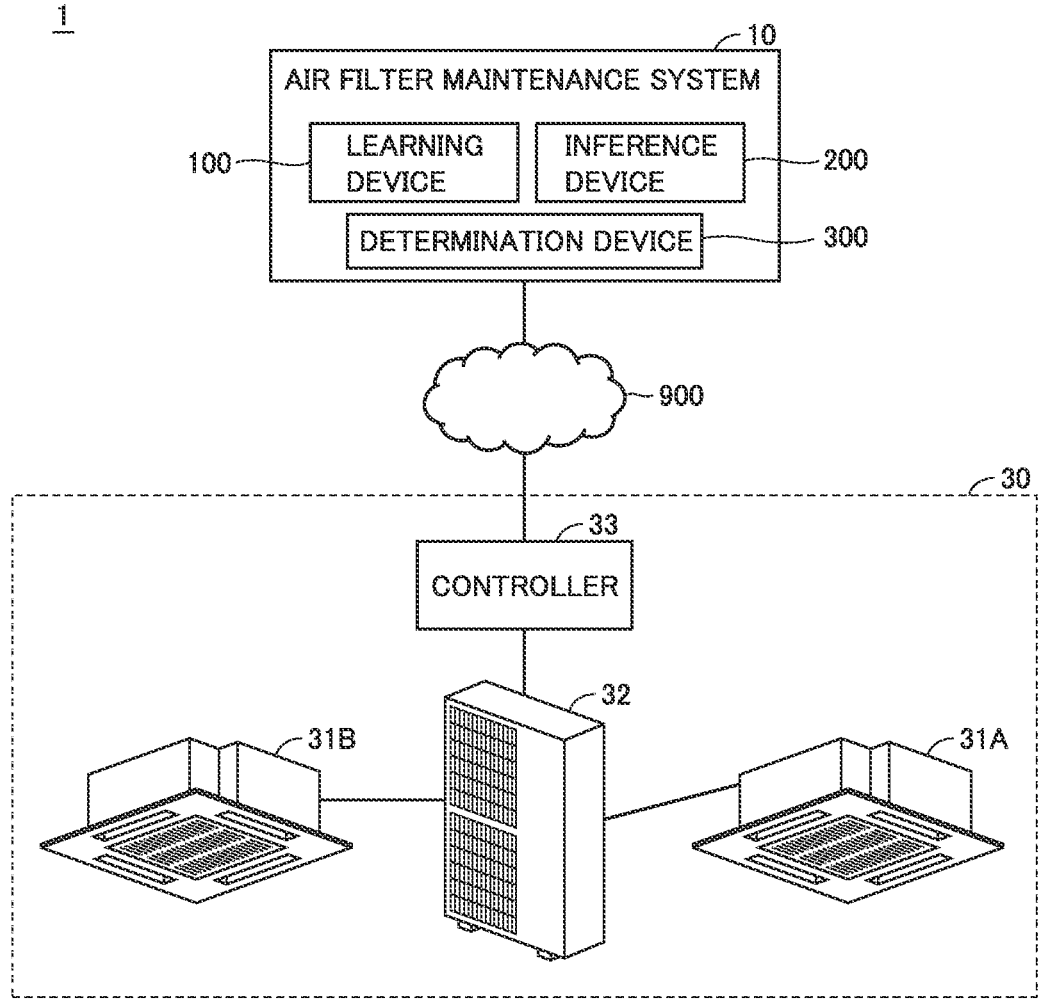
FIG. 1 is a block diagram illustrating an example of a configuration of an air filter maintenance system including a learning device and an inference device according to an embodiment and an air-conditioning system in which a maintenance timing of an air filter is monitored by the air filter maintenance system.

An embodiment of the present disclosure will now be described in detail with reference to the drawings. The same or corresponding parts in the drawings are denoted by the same reference signs, and the description thereof will not be repeated in principle.

FIG. 1 is a block diagram illustrating an example of a configuration of an air filter maintenance system 10 including a learning device 100 and an inference device 200 according to the embodiment and an air-conditioning system 30 in which a maintenance timing of an air filter is monitored by air filter maintenance system 10. As illustrated in FIG. 1, air filter maintenance system 10 includes learning device 100, inference device 200, and a determination device 300. Air-conditioning system 30 includes indoor units 31A and 31B, an outdoor unit 32, and a controller 33. Indoor units 31A and 31B are connected to outdoor unit 32. Outdoor unit 32 includes a compressor, an outdoor heat exchanger, an expansion valve, and a fan. A refrigerant is supplied from the compressor to each of indoor units 31A and 31B. The refrigerant circulates between indoor unit 31A and outdoor unit 32, and also circulates between indoor unit 31B and outdoor unit 32. Control device 33 includes a thermostat and integrally controls air-conditioning system 30. Control device 33 is connected to air filter maintenance system 10 via a network 900. Network 900 includes the Internet and a cloud system.

Figure 2:
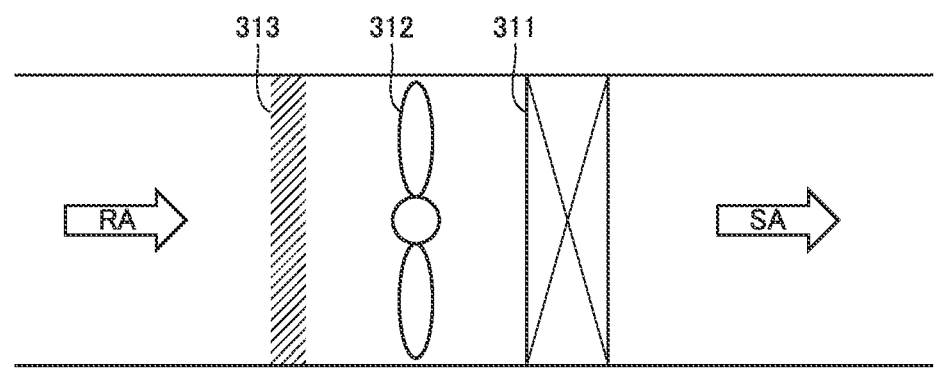
FIG. 2 is a diagram for describing a flow of air in each of indoor units in FIG. 1.

FIG. 2 is a diagram for describing a flow of air in each of indoor units 31A and 31B in FIG. 1. As illustrated in FIG. 2, each of indoor units 31A and 31B includes an indoor heat exchanger 311, a fan 312, and an air filter 313. Return air RA is sucked from the outside of each of indoor units 31A and 31B by the airflow formed by fan 312. Return air RA passes through air filter 313 and flows toward indoor heat exchanger 311. Air warmed by the indoor heat exchanger or cooled by the indoor heat exchanger is supplied as supply air SA to a space to be air-conditioned. Dust and the like included in return air RA are removed by air filter 313. When being used for a long period of time, air filter 313 is clogged with dust or the like, so that the dust resistance of air filter 313 is reduced, and an amount of air passing through air filter 313 per unit time is reduced. In order to maintain an amount of air supplied to the space to be air-conditioned per unit time, it is necessary to increase the rotation speed of fan 312 as an amount of air passing through air filter 313 per unit time decreases. That is, in order to maintain the air-conditioning power in a state where the air filter is clogged, it is necessary to increase an amount of electric power used in air-conditioning system 30. In order to suppress an increase in electric power cost, it is necessary to perform maintenance (cleaning or replacement) of air filter 313 at an appropriate timing.

Figure 3:
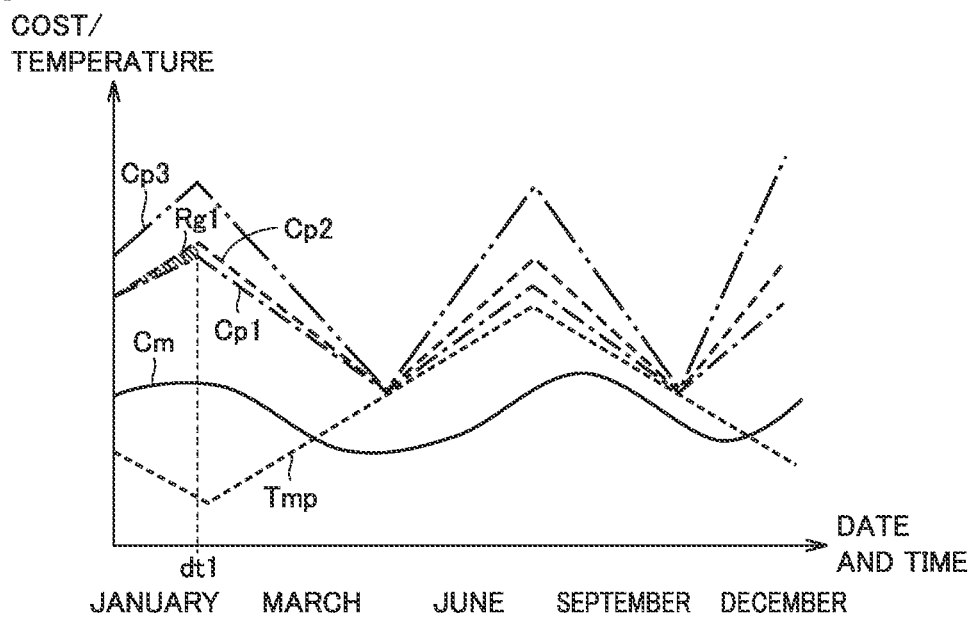
FIG. 3 is a diagram including a graph illustrating an example of a change in electric power cost of the air-conditioning system in FIG. 1 throughout the year, a graph illustrating an example of a change in cost required for maintenance of the air filter in FIG. 2 throughout the year, and a graph illustrating an example of a change in temperature throughout the year.

FIG. 3 is a diagram including graphs Cp1, Cp2, and Cp3 illustrating an example of a change in electric power cost of air-conditioning system 30 in FIG. 1 throughout the year, a graph Cm illustrating an example of a change in cost required for maintenance of air filter 313 in FIG. 2 throughout the year, and a graph Tmp illustrating an example of a change in temperature throughout the year. Graph Cp1 indicates a change in electric power cost when brand-new air filter 313 is used for one year. Graph Cp2 indicates an electric power cost when air filter 313 which has been used for one year is used for one year. Graph Cp3 indicates an electric power cost when air filter 313 which has been used for two years is used for one year. As illustrated in FIG. 3, the longer the use period of air filter 313, the more the clogging of air filter 313 progresses, and thus the electric power cost increases in the order of graphs Cp1 to Cp3 for most of the year. In particular, the increase in electric power cost depending on the use period is significant in the period from January to March having the lowest temperature and the period from June to September having the highest temperature. For example, an amount of increase in electric power cost from January 1 which marks the second year after the use of brand-new air filter 313 to a date and time dt1 is represented by a value (area of a region Rg1) obtained by integrating the absolute value of the difference between graphs Cp2 and Cp1 from January 1 to date and time dt1. Therefore, it is likely that the air filter needs maintenance in the period from January to March and the period from June to September. However, the maintenance cost of the air filter is the highest in the period from January to March and the period from September to December. As described above, it is necessary to comprehensively consider various elements in order to determine the optimum maintenance timing of the air filter. Therefore, it is difficult to determine the optimum maintenance timing of the air filter by the rule-based method using a uniform determination criterion.

In view of this, air filter maintenance system 10 generates trained models that have been trained respectively for the relationship between both of the degree of clogging and the air-conditioning power and an increased amount of cost, the relationship between the date and time and the air-conditioning power, and the relationship between the date and time and the maintenance cost. By using these trained models, it is possible to comprehensively consider the degree of clogging, the air-conditioning power, the increased amount of cost, the date and time, and the maintenance cost. The optimal maintenance timing of the air filter can be determined by comprehensive consideration, whereby the maintenance cost of the air filter can be reduced.

Figure 4:
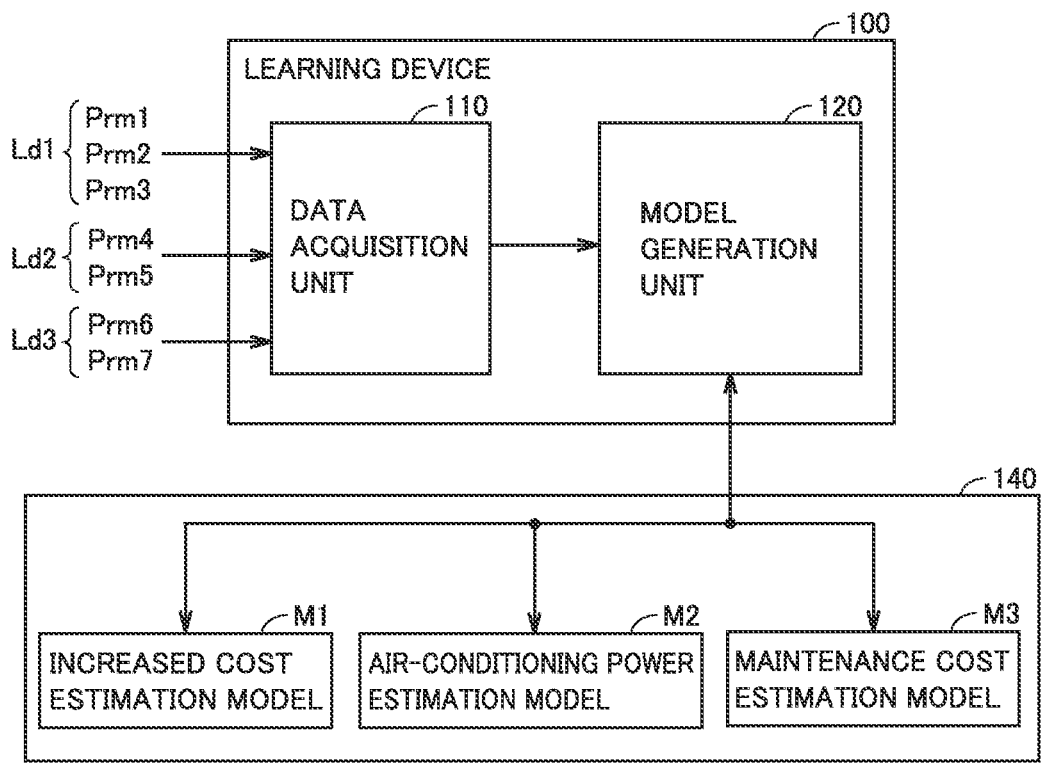
FIG. 4 is a block diagram illustrating a configuration of the learning device in FIG. 1.

FIG. 4 is a block diagram illustrating a configuration of learning device 100 in FIG. 1. As illustrated in FIG. 4, learning device 100 includes a data acquisition unit 110 (first data acquisition unit) and a model generation unit 120. A trained model storage unit 140 provided outside learning device 100 stores an increased cost estimation model M1, an air-conditioning power estimation model M2, and a maintenance cost estimation model M3. Note that trained model storage unit 140 may be provided inside learning device 100.

Increased cost estimation model M1 receives a clogging degree parameter Prm1 (first parameter) and an air-conditioning power control parameter Prm2 (second parameter), and outputs an increased cost amount parameter Prm3 (third parameter). Air-conditioning power estimation model M2 receives a date and time parameter Prm4 (fourth parameter) and outputs an air-conditioning power control parameter Prm5 (fifth parameter). Maintenance cost estimation model M3 receives a date and time parameter Prm6 (sixth parameter) and outputs a maintenance cost parameter Prm7 (seventh parameter). Each of increased cost estimation model M1, air-conditioning power estimation model M2, and maintenance cost estimation model M3 includes a neural network.

Data acquisition unit 110 acquires clogging degree parameter Prm1, air-conditioning power control parameter Prm2, and increased cost amount parameter Prm3 as training data Ld1. Clogging degree parameter Prm1 represents the degree of clogging of air filter 313 using a scale from 0% to 100%. Air-conditioning power control parameter Prm2 includes ON/OFF of the thermostat, a rotation frequency of the compressor, wind power of the fan, an evaporation temperature of the refrigerant, and a condensation temperature of the refrigerant. Increased cost amount parameter Prm3 is ground truth data representing an increased amount of electric power cost that occurs in clogging degree parameter Prm1 and air-conditioning power control parameter Prm2, and represents an amount of increase in electric power cost based on the state where the clogging degree parameter of air filter 313 is 0%. For example, when clogging degree parameter Prm1 is 60%, the air-conditioning power corresponding to air-conditioning power control parameter Prm2 is level X, and increased cost amount parameter Prm3 indicates an amount of increase in electric power cost per hour, increased cost amount parameter Prm3 is 1.5 yen.

Model generation unit 120 learns the relationship between both of clogging degree parameter Prm1 and air-conditioning power control parameter Prm2 and increased cost amount parameter Prm3 using training data Ld1 which is created using the combination of clogging degree parameter Prm1, air-conditioning power control parameter Prm2, and increased cost amount parameter Prm3. Model generation unit 120 converts increased cost estimation model M1 into a trained model using training data Ld1.

Data acquisition unit 110 acquires date and time parameter Prm4 and air-conditioning power control parameter Prm5 as training data Ld2. Air-conditioning power control parameter Prm5 is ground truth data representing the air-conditioning power assumed on the date and time specified by date and time parameter Prm4. Air-conditioning power control parameter Prm5 includes ON/OFF of the thermostat, a rotation frequency of the compressor, wind power of the fan, an evaporation temperature of the refrigerant, and a condensation temperature of the refrigerant.

Model generation unit 120 learns the relationship between date and time parameter Prm4 and air-conditioning power control parameter Prm5 using training data Ld2 which is created using the combination of date and time parameter Prm4 and air-conditioning power control parameter Prm5. Model generation unit 120 converts air-conditioning power estimation model M2 into a trained model using training data Ld2.

Data acquisition unit 110 acquires date and time parameter Prm6 and maintenance cost parameter Prm7 as training data Ld3. Maintenance cost parameter Prm7 is ground truth data representing the maintenance cost of the air filter required on the date and time specified by date and time parameter Prm6. Maintenance cost parameter Prm7 is, for example, an amount of money per day or an amount of money per hour.

Model generation unit 120 learns the relationship between date and time parameter Prm6 and maintenance cost parameter Prm7 using training data Ld3 which is created using the combination of date and time parameter Prm6 and maintenance cost parameter Prm7. Model generation unit 120 converts maintenance cost estimation model M3 into a trained model using training data Ld3.

The learning algorithm used by model generation unit 120 may be a known algorithm such as supervised learning, unsupervised learning, or reinforcement learning. The case where a neural network is applied will be described below.

Model generation unit 120 learns an increased amount of cost, air-conditioning power, and the maintenance cost of the air filter by so-called supervised learning in accordance with, for example, a neural network model. Here, the supervised learning refers to a method of learning features included in training data by giving a set of data of an input and a result (label) to learning device 100 and inferring a result from the input.

The neural network includes an input layer including a plurality of neurons, an intermediate layer (hidden layer) including a plurality of neurons, and an output layer including a plurality of neurons. The intermediate layer may include one layer or two or more layers.

Figure 5:
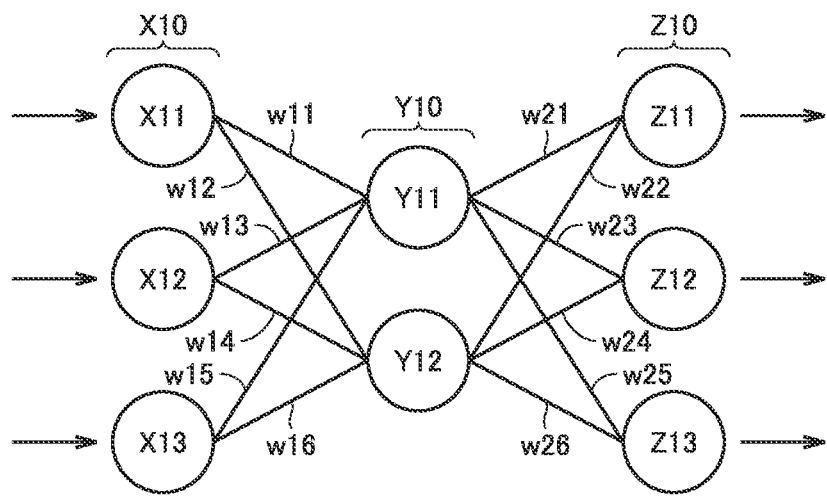
FIG. 5 is a diagram illustrating an example of a neural network.

FIG. 5 is a diagram illustrating a neural network Nw1 which is an example of the neural network. As illustrated in FIG. 5, neural network Nw1 includes an input layer X10, an intermediate layer Y10, and an output layer Z10. Input layer X10 includes neurons X11, X12, and X13. Intermediate layer Y10 includes neurons Y11 and Y12. Output layer Z10 includes neurons Z11, Z12, and Z13. Input layer X10 and intermediate layer Y10 are fully connected to each other. Intermediate layer Y10 and output layer Z10 are fully connected to each other.

When a plurality of inputs is input to neurons X11 to X13 of input layer X10, the values thereof are multiplied by weights w11 to w16 and input to neurons Y11 and Y12 of intermediate layer Y10. Outputs from neurons Y11 and Y12 are multiplied by weights w21 to w26, and are output from neurons Z11 to Z13 of output layer Z10. The output result from output layer Z10 varies depending on the values of weights w11 to w16 and w21 to w26.

The neural network of increased cost estimation model M1 learns an increased amount of cost by supervised learning in accordance with training data Ld1 created using the combination of the degree of clogging, the air-conditioning power, and the increased amount of cost (ground truth data) acquired by data acquisition unit 110. That is, the weight and bias of the neural network of increased cost estimation model M1 are updated by back propagation with respect to the error between the result output from the output layer in response to an input of the degree of clogging and the air-conditioning power to the input layer and the ground truth data such that the result approaches the increased amount of cost (ground truth data).

The neural network of air-conditioning power estimation model M2 learns the air-conditioning power by supervised learning in accordance with training data Ld2 created based on the combination of the date and time and the air-conditioning power (ground truth data). That is, the weight and bias of the neural network of air-conditioning power estimation model M2 are updated by back propagation with respect to the error between the result output from the output layer in response to an input of the date and time to the input layer and the ground truth data such that the result approaches the air-conditioning power (ground truth data).

Maintenance cost estimation model M3 learns the maintenance cost of the air filter by supervised learning in accordance with training data Ld3 created using the combination of the date and time and the maintenance cost (ground truth data). That is, the weight and bias of the neural network of maintenance cost estimation model M3 are updated by back propagation with respect to the error between the result output from the output layer in response to an input of the date and time to the input layer and the ground truth data such that the result approaches the maintenance cost of the air filter (ground truth data).

Figure 6:
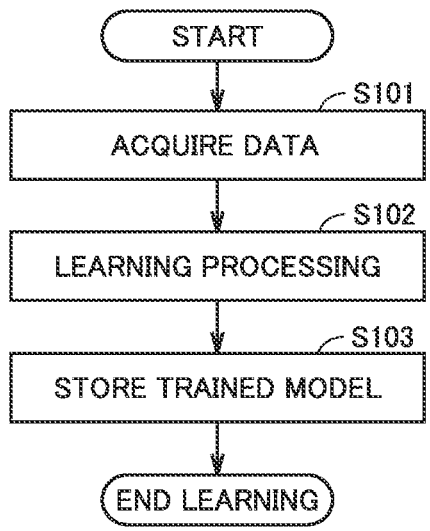
FIG. 6 is a flowchart illustrating learning processing performed by the learning device in FIG. 4.

FIG. 6 is a flowchart illustrating learning processing performed by learning device 100 in FIG. 4. In the following, steps are simply indicated as S. As illustrated in FIG. 6, data acquisition unit 110 acquires training data Ld1 to Ld3 in S101. Clogging degree parameter Prm1, air-conditioning power control parameter Prm2, and increased cost amount parameter Prm3 are not necessarily acquired at the same time as long as they are associated with each other, and may be acquired at different timings. The same applies to date and time parameter Prm4, air-conditioning power control parameter Prm5, date and time parameter Prm6, and maintenance cost parameter Prm7.

In S102, model generation unit 120 learns the increased amount of cost, the air-conditioning power, and the maintenance cost of the air filter by so-called supervised learning in accordance with training data Ld1 to Ld3 acquired by data acquisition unit 110, and converts each of increased cost estimation model M1, air-conditioning power estimation model M2, and maintenance cost estimation model M3 into a trained model.

In S103, model generation unit 120 stores, in trained model storage unit 140, increased cost estimation model M1 which has been trained, air-conditioning power estimation model M2 which has been trained, and maintenance cost estimation model M3 which has been trained.

Figure 7:
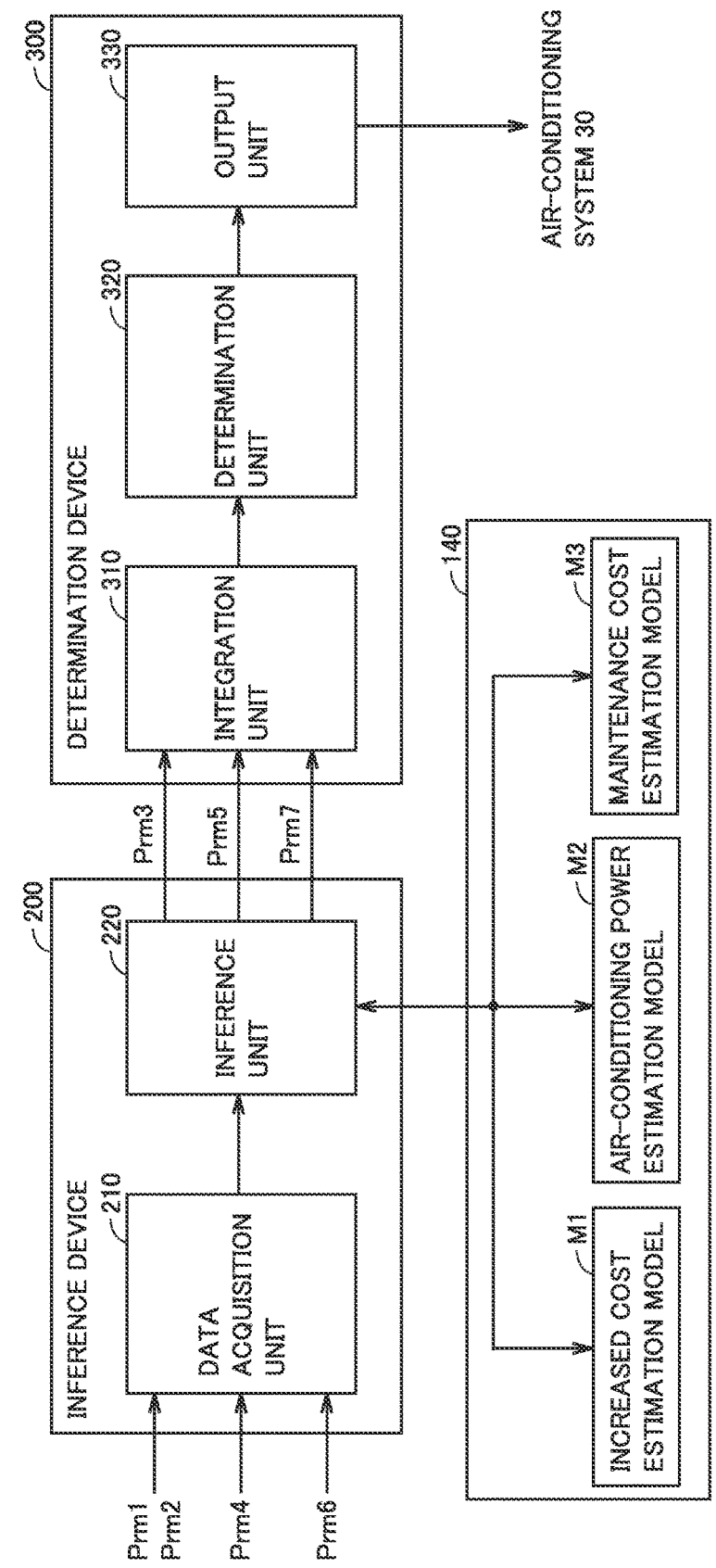
FIG. 7 is a block diagram illustrating a configuration of the inference device and a determination device in FIG. 1.

FIG. 7 is a block diagram illustrating a configuration of inference device 200 and determination device 300 illustrated in FIG. 1. Inference device 200 includes a data acquisition unit 210 and an inference unit 220. Determination device 300 includes an integration unit 310, a determination unit 320, and an output unit 330.

Data acquisition unit 210 acquires clogging degree parameter Prm1, air-conditioning power control parameter Prm2, date and time parameter Prm4, and date and time parameter Prm6. Clogging degree parameter Prm1 of the air filter is detected using a conventional method. Inference unit 220 estimates increased cost amount parameter Prm3, air-conditioning power control parameter Prm5, and maintenance cost parameter Prm7 using trained models M1 to M3 stored in trained model storage unit 140. That is, increased cost amount parameter Prm3, air-conditioning power control parameter Prm5, and maintenance cost parameter Prm7 can be estimated by inputting clogging degree parameter Prm1, air-conditioning power control parameter Prm2, date and time parameter Prm4, and date and time parameter Prm6 which have been acquired by data acquisition unit 210 to trained models M1 to M3. In the embodiment, increased cost amount parameter Prm3, air-conditioning power control parameter Prm5, and maintenance cost parameter Prm7 are estimated using the trained models trained by model generation unit 120 in FIG. 3. However, increased cost amount parameter Prm3, air-conditioning power control parameter Prm5, and maintenance cost parameter Prm7 may be output using a trained model trained in another environment.

Figure 8:
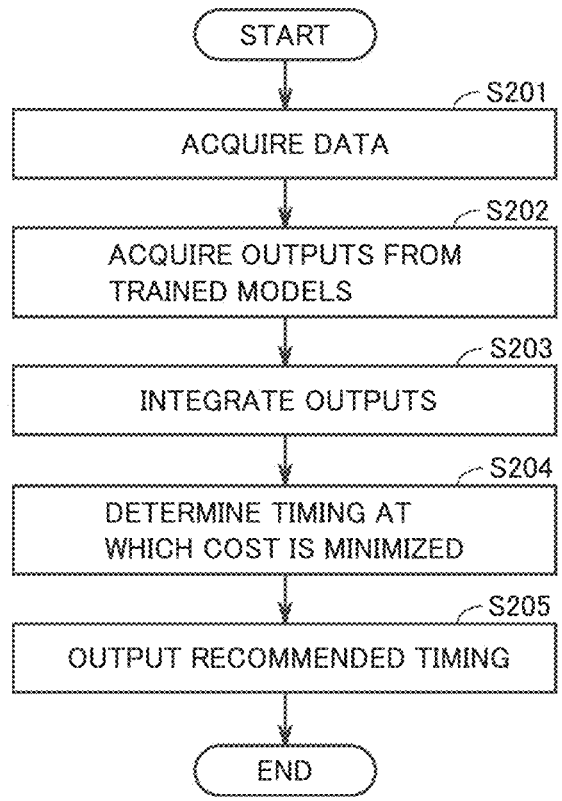
FIG. 8 is a flowchart illustrating inference processing performed by the inference device in FIG. 7.

FIG. 8 is a flowchart illustrating inference processing performed by inference device 200 in FIG. 7. As illustrated in FIG. 8, data acquisition unit 210 acquires clogging degree parameter Prm1, air-conditioning power control parameter Prm2, date and time parameter Prm4, and date and time parameter Prm6 in S201. In S202, inference unit 220 inputs clogging degree parameter Prm1, air-conditioning power control parameter Prm2, date and time parameter Prm4, and date and time parameter Prm6 to trained models M1 to M3 stored in trained model storage unit 140, and acquires increased cost amount parameter Prm3, air-conditioning power control parameter Prm5, and maintenance cost parameter Prm7. In S203, integration unit 310 integrates increased cost amount parameter Prm3, air-conditioning power control parameter Prm5, and maintenance cost parameter Prm7 obtained from trained models M1 to M3. In S204, determination unit 320 calculates a total cost for maintenance of air filter 313 using increased cost amount parameter Prm3 output from increased cost estimation model M1 which has been trained, the air-conditioning power corresponding to air-conditioning power control parameter Prm5 output from air-conditioning power estimation model M2 which has been trained, and the maintenance cost of air filter 313 output from maintenance cost estimation model M3, and determines a timing at which the total cost is minimized. In S205, output unit 330 outputs the timing to controller 33 of air-conditioning system 30.

As described above, according to inference device 200 and determination device 300, the optimum maintenance timing of the air filter can be output by estimating the increased amount of cost caused by factors such as the type to which the air filter is installed, the spatial installation location, and the reduction in efficiency of the air conditioner due to the clogging of the air filter with respect to the temporal air-conditioning power and the maintenance cost of the air filter that varies depending on the implementation time.

In the embodiment, supervised learning is applied to the learning algorithm used by model generation unit 120. However, the learning algorithm is not limited to the supervised learning. In addition to supervised learning, reinforcement learning, unsupervised learning, semi-supervised learning, or the like can be applied to the learning algorithm.

In addition, model generation unit 120 may learn the increased amount of cost, the air-conditioning power, and the maintenance cost of the air filter using training data acquired from a plurality of air-conditioning systems 30. Model generation unit 120 may acquire the training data from a plurality of air-conditioning systems 30 used in the same area, or may learn the increased amount of cost, the air-conditioning power, and the maintenance cost of the air filter using training data collected from a plurality of air-conditioning systems 30 operating independently in different areas. In addition, air-conditioning system 30 that collects the training data can also be added as a target to be trained or removed from the target to be trained. Furthermore, learning device 100 that has been trained for the increased amount of cost, the air-conditioning power, and the maintenance cost of the air filter for certain air-conditioning system 30 may be applied to another air-conditioning system 30, and trained again and updated for the increased amount of cost, the air-conditioning power, and the maintenance cost of the air filter for the other air-conditioning system 30.

In addition, as a learning algorithm used in model generation unit 120, deep learning for learning extraction of feature amounts can be used, and machine learning may be executed according to another known method, for example, a neural network, genetic programming, functional logic programming, a support vector machine, or the like.

In the embodiment, learning device 100 and inference device 200 are connected to air-conditioning system 30 via network 900 and are separate from air-conditioning system 30. However, learning device 100 and inference device 200 may be incorporated in air-conditioning system 30. Furthermore, learning device 100 and inference device 200 may be placed on a cloud server.

Figure 9:
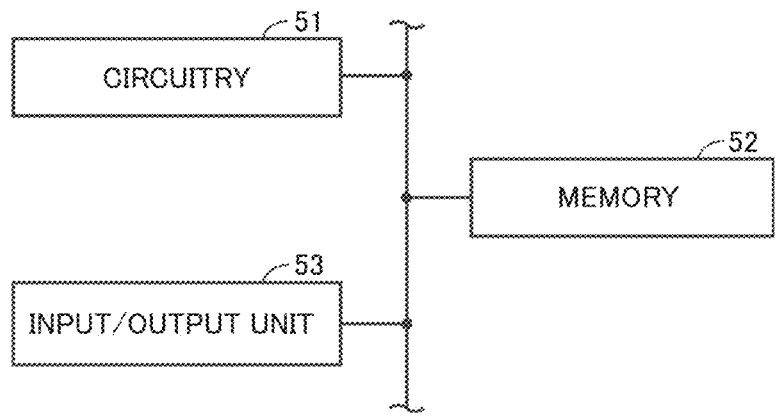
FIG. 9 is a block diagram illustrating a hardware configuration of the air filter maintenance system in FIG. 1.

FIG. 9 is a block diagram illustrating a hardware configuration of air filter maintenance system 10 in FIG. 1. As illustrated in FIG. 9, air filter maintenance system 10 includes a circuitry 51, a memory 52 (storage unit), and an input/output unit 53. Processing circuit 51 includes a central processing unit (CPU) that executes a program stored in memory 52. Processing circuit 51 may include a graphics processing unit (GPU). The functions of air filter maintenance system 10 are implemented by software, firmware, or a combination of software and firmware. The software or firmware is described as a program and stored in memory 52. Processing circuit 51 reads and executes the program stored in memory 52. Note that the CPU is also called a central processing unit, a processing unit, an arithmetic unit, a microprocessor, a microcomputer, a processor, or a digital signal processor (DSP).

Memory 52 includes a nonvolatile or volatile semiconductor memory (for example, a random access memory (RAM), a read only memory (ROM), a flash memory, an erasable programmable read only memory (EPROM), or an electrically erasable programmable read only memory (EEPROM)), a magnetic disk, a flexible disk, an optical disk, a compact disk, a mini disk, or a digital versatile disc (DVD). Memory 52 stores, for example, a trained model, an air filter maintenance program, and a machine learning program.

Input/output unit 53 receives an operation performed by a user and outputs a processing result to the user. Input/output unit 53 includes, for example, a mouse, a keyboard, a touch panel, a display, and a speaker.

As described above, according to the learning device and the inference device of the embodiment, the maintenance cost of the air filter can be reduced.

It should be understood that the embodiment disclosed herein is illustrative in all respects and not restrictive. The scope of the present disclosure is defined not by the above description but by the claims, and is intended to include meanings equivalent to the claims and all modifications within the scope.

REFERENCE SIGNS LIST

10: air filter maintenance system, 30: air-conditioning system, 31A, 31B: indoor unit, 32: outdoor unit, 33: controller, 51: circuitry, 52: memory, 53: input/output unit, 100: learning device, 110, 210: data acquisition unit, 120: model generation unit, 140: trained model storage unit, 200: inference device, 220: inference unit, 300: determination device, 310: integration unit, 311: indoor heat exchanger, 312: fan, 313: air filter, 320: determination unit, 330: output unit, 900: network, Ld1, Ld2, Ld3: training data, M1: increased cost estimation model, M2: air-conditioning power estimation model, M3: maintenance cost estimation model, Nw1: neural network, Prm1: clogging degree parameter, Prm2, Prm5: air-conditioning power control parameter, Prm3: increased cost amount parameter, Prm4, Prm6: date and time parameter, Prm7: maintenance cost parameter

The invention claimed is:

1. A learning device that learns maintenance of an air-conditioning system including at least one air filter, the learning device comprising:
   a circuitry configured to:
   convert each of a first model, a second model, and a third model into a trained model by machine learning using a first training data, a second training data, and a third training data, wherein
      the first training data includes a first parameter representing a degree of clogging of the at least one air filter, a second parameter pertaining to air-conditioning power of the air-conditioning system, and a third parameter representing an increased amount of electric power cost of the air-conditioning system due to the first parameter during operation of the second parameter,
      the second training data includes a fourth parameter representing a first date and time and a fifth parameter pertaining to air-conditioning power of the air-conditioning system assumed on the first date and time,
      the third training data includes a sixth parameter representing a second date and time and a seventh parameter representing a maintenance cost of the at least one air filter on the second date and time,
      the first model estimates the third parameter from the first parameter and the second parameter,
      the second model estimates the fifth parameter from the fourth parameter, and
      the third model estimates the seventh parameter from the sixth parameter; and
   instruct timing for maintenance on the at least one air filter based on the estimated third parameter from the first model which has been trained, the estimated fifth parameter from the second model which has been trained, and the estimated seventh parameter from the third model which has been trained.

2. The learning device according to claim 1, wherein
   each of the third parameter, the fifth parameter, and the seventh parameter is ground truth data, and
   the circuitry is configured to perform supervised learning for each of the first model, the second model, and the third model.

3. The learning device according to claim 1, wherein
   the circuitry is configured to generate each of the first model, the second model, and the third model by supervised learning.

4. An inference device for an air filter maintenance system that maintains an air-conditioning system including at least one air filter, the inference device comprising:
   a circuitry configured to
   acquire, as time passes, a first parameter that represents a degree of clogging of the at least one air filter detected by the air-conditioning system, a second parameter that pertains to air-conditioning power of the air-conditioning system indicated by the air-conditioning system, a fourth parameter that represents a first date and time, and a sixth parameter that represents a second date and time, wherein the first parameter, the second parameter, the fourth parameter, and the sixth parameter temporally change;

use a first model that has been trained on the first parameter and the second parameter, a second model that has been trained on the fourth parameter, and a third model that has been trained on the sixth parameter, the first model, the second model, and the third model being generated by a learning device, wherein the circuitry is further configured to estimate, using the first model that has been trained, a third parameter being ground truth data representing an increased amount of electric power cost of the air-conditioning system based on the acquired first parameter during operation of the acquired second parameter, wherein the first parameter, the second parameter, and the third parameter are associated with each other, and temporally change, estimate, using the second model that has been trained, a fifth parameter being ground truth data pertaining to air-conditioning power of the air-conditioning system assumed on the first date and time of the acquired fourth parameter, wherein the fourth parameter and the fifth parameter are associated with each other, and temporally change, estimate, using the third model that has been trained, a seventh parameter representing a maintenance cost of the at least one air filter on the second date and time of the acquired sixth parameter, wherein the sixth parameter and the seventh parameter are associated with each other, and temporally change; and instruct timing for maintenance on the at least one air filter based on the estimated third parameter from the first model which has been trained, the estimated fifth parameter from the second model which has been trained, and the estimated seventh parameter from the third model which has been trained.

5. The inference device according to claim 4, wherein each of the first model, the second model, and the third model is generated by supervised learning.

6. The inference device according to claim 4, wherein the first model, the second model, and the third model include neural networks.

7. An inference device that infers maintenance of an air-conditioning system including at least one air filter using a first model, a second model, and a third model that have been trained by machine learning,
the first model estimating a third parameter from a first parameter and a second parameter,
the second model estimating a fifth parameter from a fourth parameter,
the third model estimating a seventh parameter from a sixth parameter,
the first parameter representing a degree of clogging of the at least one air filter,
the second parameter pertaining to air-conditioning power of the air-conditioning system,
the third parameter representing an increased amount of electric power cost of the air-conditioning system due to the first parameter during operation of the second parameter,
the fourth parameter representing a first date and time, the fifth parameter representing air-conditioning power of the air-conditioning system assumed on the first date and time,
the sixth parameter representing a second date and time,
the seventh parameter representing a maintenance cost of the at least one air filter on the second date and time,
the inference device comprising:
a circuitry configured to:
estimate the third parameter from the first parameter and the second parameter using the first model;
estimate the fifth parameter from the fourth parameter using the second model;
estimate the seventh parameter from the sixth parameter using the third model; and
instruct timing for maintenance on the at least one air filter based on the estimated third parameter from the first model which has been trained, the estimated fifth parameter from the second model which has been trained, and the estimated seventh parameter from the third model which has been trained.

8. The inference device according to claim 7, wherein the machine learning includes supervised learning.

9. The learning device according to claim 1, wherein the first model, the second model, and the third model include neural networks.

10. The learning device according to claim 1, wherein the circuitry is configured to
acquire, as time passes, the first training data, wherein the first training data includes the first parameter representing the degree of clogging of the at least one air filter which is detected by the air-conditioning system and acquired from the air-conditioning system, the second parameter pertaining to air-conditioning power of the air-conditioning system indicated by the air-conditioning system and acquired from the air-conditioning system, and the third parameter being ground truth data representing the increased amount of electric power cost of the air-conditioning system estimated based on the first parameter during operation of the second parameter, wherein the first parameter, the second parameter, and the third parameter are associated with each other, and temporally change,
acquire, as time passes, the second training data, wherein the second training data includes the fourth parameter representing the first date and time which is input and the fifth parameter being ground truth data pertaining to air-conditioning power of the air-conditioning system assumed on the first date and time, wherein the fourth parameter and the fifth parameter are associated with each other, and temporally change, and
acquire, as time passes, the third training data, wherein the third training data includes the sixth parameter representing the second date and time which is input and the seventh parameter representing the maintenance cost of the at least one air filter on the second date and time, wherein the sixth parameter and the seventh parameter are associated with each other, and temporally change.

11. The learning device according to claim 1, further comprising:
a memory configured to store the first model, the second model, and the third model.

12. The inference device according to claim 7, wherein the first model, the second model, and the third model include neural networks.

13. The inference device according to claim 7, wherein each of the first model, the second model, and the third model is generated by supervised learning.

14. The inference device according to claim 7, wherein the circuitry is configured to
acquire, as time passes, first training data, wherein the first training data includes the first parameter representing the degree of clogging of the at least one air filter which is detected by the air-conditioning system and acquired from the air-conditioning system, the second parameter pertaining to air-conditioning power of the air-conditioning system indicated by the air-conditioning system and acquired from the air-conditioning system, and the third parameter being ground truth data representing the increased amount of electric power cost of the air-conditioning system estimated based on the first parameter during operation of the second parameter, wherein the first parameter, the second parameter, and the third parameter are associated with each other, and temporally change,
acquire, as time passes, second training data, wherein the second training data includes the fourth parameter representing the first date and time which is input and the fifth parameter being ground truth data pertaining to air-conditioning power of the air-conditioning system assumed on the first date and time, wherein the fourth parameter and the fifth parameter are associated with each other, and temporally change, and
acquire, as time passes, third training data, wherein the third training data includes the sixth parameter representing the second date and time which is input and the seventh parameter representing the maintenance cost of the at least one air filter on the second date and time, wherein the sixth parameter and the seventh parameter are associated with each other, and temporally change.

15. The inference device according to claim 7, further comprising:
a memory configured to store the first model, the second model, and the third model.

* * * * *